United States Patent
Lee et al.

(10) Patent No.: US 7,505,096 B2
(45) Date of Patent: Mar. 17, 2009

(54) LIQUID CRYSTAL DISPLAY AND METHOD OF MANUFACTURING THE SAME

(75) Inventors: Myung-sub Lee, Suwon-si (KR);
Ju-yeon Baek, Cheonan-si (KR);
Ji-young Jeong, Cheonan-si (KR);
Yun-seok Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 288 days.

(21) Appl. No.: 11/496,413

(22) Filed: Jul. 31, 2006

(65) Prior Publication Data

US 2007/0024775 A1 Feb. 1, 2007

(30) Foreign Application Priority Data

Jul. 30, 2005 (KR) ............... 10-2005-0070033

(51) Int. Cl.
*G02F 1/1333* (2006.01)
*G02F 1/13* (2006.01)

(52) U.S. Cl. .................. 349/110; 349/42; 349/43; 349/122; 349/138; 349/155; 349/187

(58) Field of Classification Search .................. 349/110, 349/42, 43, 122, 138, 155, 187, 189, 190
See application file for complete search history.

(56) References Cited

U.S. PATENT DOCUMENTS

| 5,473,450 | A | * | 12/1995 | Yamada et al. | 349/84 |
| 5,643,471 | A | * | 7/1997 | Onishi et al. | 216/23 |
| 2004/0183989 | A1 | * | 9/2004 | Kim et al. | 349/155 |
| 2006/0274220 | A1 | * | 12/2006 | Kim | 349/56 |
| 2007/0024775 | A1 | * | 2/2007 | Lee et al. | 349/110 |

* cited by examiner

*Primary Examiner*—Brian M Healy
(74) *Attorney, Agent, or Firm*—Cantor Colburn LLP

(57) ABSTRACT

A liquid crystal display and a method of manufacturing the same include: a first plate having a thin film transistor, a second plate having an insulating substrate having a plurality of spacer members, the spacer members being disposed on the insulating substrate, preventing light leakage from the first plate and maintaining a predetermined distance between the first plate and the second plate, and a liquid crystal layer interposed between the first plate and the second plate and having liquid crystal molecules aligned in a predetermined direction.

14 Claims, 9 Drawing Sheets

LIQUID CRYSTAL DISPLAY AND METHOD OF MANUFACTURING THE SAME

This application claims priority to Korean Patent Application No. 10-2005-0070033, filed on Jul. 30, 2005, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display, and more particularly, to a liquid crystal display ("LCD") that can be manufactured in a simplified process and a method of manufacturing the LCD.

2. Description of the Related Art

An LCD displays a desired image using electrical and optical properties of liquid crystals injected into a liquid crystal panel. An LCD is thin, lightweight, and has low power consumption compared to a cathode ray tube ("CRT"). For these reasons, LCDs are used extensively in a variety of applications, including devices such as display monitors, portable computer displays, desktop computer displays, high definition ("HD") imaging systems, and the like.

An LCD generally includes a liquid crystal panel assembly and a backlight assembly. The liquid crystal panel assembly may include a liquid crystal panel, a driving integrated circuit ("IC"), and a flexible printed circuit board. The liquid crystal panel is formed by injecting a liquid crystal material having an anisotropic dielectric constant between a first plate and a second plate. The driving IC applies a driving signal to a gate line and a data line formed on the liquid crystal panel. The flexible printed circuit board connects the driving IC with a printed circuit board, which transmits predetermined data signals and control signals to the driving IC. The liquid crystal panel assembly is combined with the backlight assembly including a lamp assembly and various optical sheets, thereby forming the LCD.

In a conventional color filter-on-thin film transistor ("COT") type LCD, a first plate has a sequentially stacked structure of a thin film transistor, a color filter, and a pixel electrode. A second plate is structured such that a black matrix layer, a planarization layer, and a common electrode layer capable of changing the alignment of liquid crystal molecules of a liquid crystal layer by a potential difference between it and the pixel electrode of the first plate are sequentially formed on an insulating substrate.

In an LCD having the above-described structure, the second plate is manufactured as follows. First, a black matrix layer is formed on an insulating substrate and patterned to form black matrix patterns having openings therein. Then, a planarization layer is coated on the insulating substrate having the black matrix patterns thereon. A common electrode is then formed on an exposed surface of the planarization layer using a transparent conductive material such as indium tin oxide (ITO) or indium zinc oxide (IZO). Finally, an organic photosensitive film is coated on an exposed surface of the common electrode, followed by exposure to light, development, etc., to form column spacers corresponding to the black matrix patterns in order to maintain a predetermined distance between the first plate and the second plate.

However, since the black matrix patterns and the column spacers are formed by separate processes, the number of processes is not optimal. In this regard, it is desired to simplify a method of manufacturing the second plate.

BRIEF SUMMARY OF THE INVENTION

The present invention provides an LCD of a color filter-on-thin film transistor ("COT") type having a simplified manufacturing method. The present invention also provides a method of manufacturing the LCD.

The above stated aspects as well as other aspects, features and advantages, of the present invention will become clearer to those skilled in the art upon review of the following detailed description.

According to an exemplary embodiment of the present invention, an LCD includes a first plate having a thin film transistor; a second plate having an insulating substrate provided with a spacer member, the spacer member being disposed on the insulating substrate thereby preventing light leakage from the first plate and maintaining a predetermined distance between the first plate and the second plate; and a liquid crystal layer interposed between the first plate and the second plate and having liquid crystal molecules aligned in a predetermined direction.

According to another exemplary embodiment of the present invention, a method of manufacturing an LCD includes coating an organic photosensitive film containing a light-blocking material on an insulating substrate of a second plate, and selectively exposing the organic photosensitive film to light using a slit mask to form a spacer member. The spacer member prevents light leakage from a thin film transistor of a first plate and maintaining a predetermined distance between the first plate and the second plate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
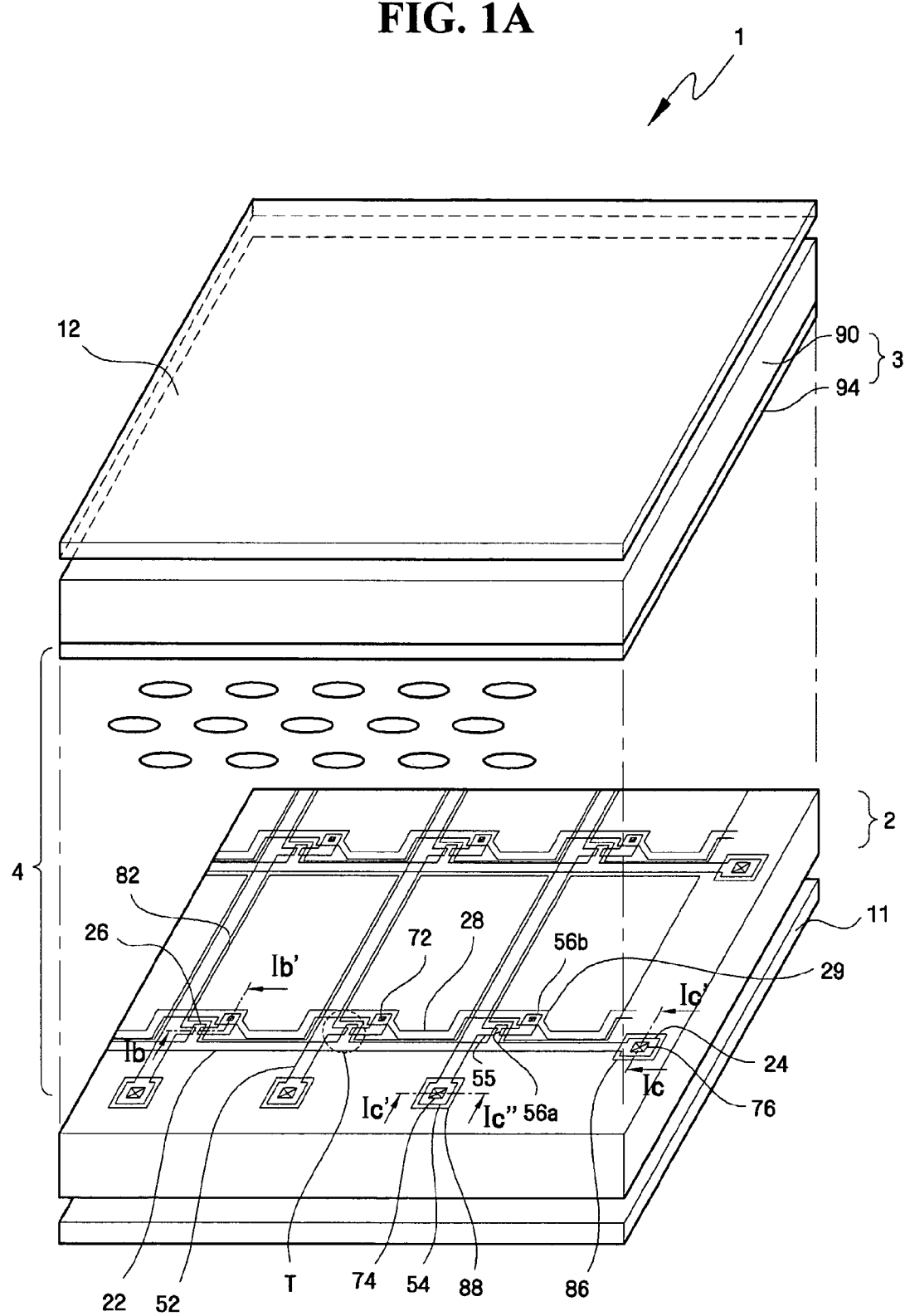
FIG. 1A is a partial perspective view illustrating an exemplary embodiment of an LCD the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. A liquid crystal display ("LCD") according to the present invention includes those for use in a portable multimedia player ("PMP"), a personal digital assistant ("PDA"), a portable digital versatile disk ("DVD") player, a cellular phone, and so on. For the convenience of explanation, the LCD according to the present invention for use in the cellular phone will now be described. The scope of the present invention is not limited to cellular phone LCDs and also may include the above-mentioned LCDs.

An exemplary embodiment of an LCD according to the present invention includes a first plate, a second plate and a liquid crystal layer interposed between the first plate and the second plate, in which the first plate includes a thin film transistor and a color filter, and the second plate includes a spacer member that prevents light leakage from the first plate and maintains a predetermined distance between the first plate and the second plate.

Such an LCD can be classified as a vertical electric field mode LCD or an in-plane switching ("IPS") mode LCD depending on a driving method used for the LCD. Both the vertical electric field mode LCD and the IPS mode LCD are within the scope of the present invention. For example, a vertical electric field mode LCD may include a first plate having a thin film transistor and a color filter, and an IPS mode LCD may include a first plate having a thin film transistor, a color filter, and a common electrode.

Hereinafter, an exemplary embodiment of a vertical electric field mode LCD including a first plate having a thin film transistor and a color filter according to the present invention and an exemplary embodiment of an IPS mode LCD including a first plate having a thin film transistor, a color filter, and a common electrode according to the present invention will be sequentially described more fully with reference to the accompanying drawings. Exemplary embodiments of methods of manufacturing the LCD according to the present invention will also be described more fully therein with reference to the accompanying drawings.

Figure 1B:
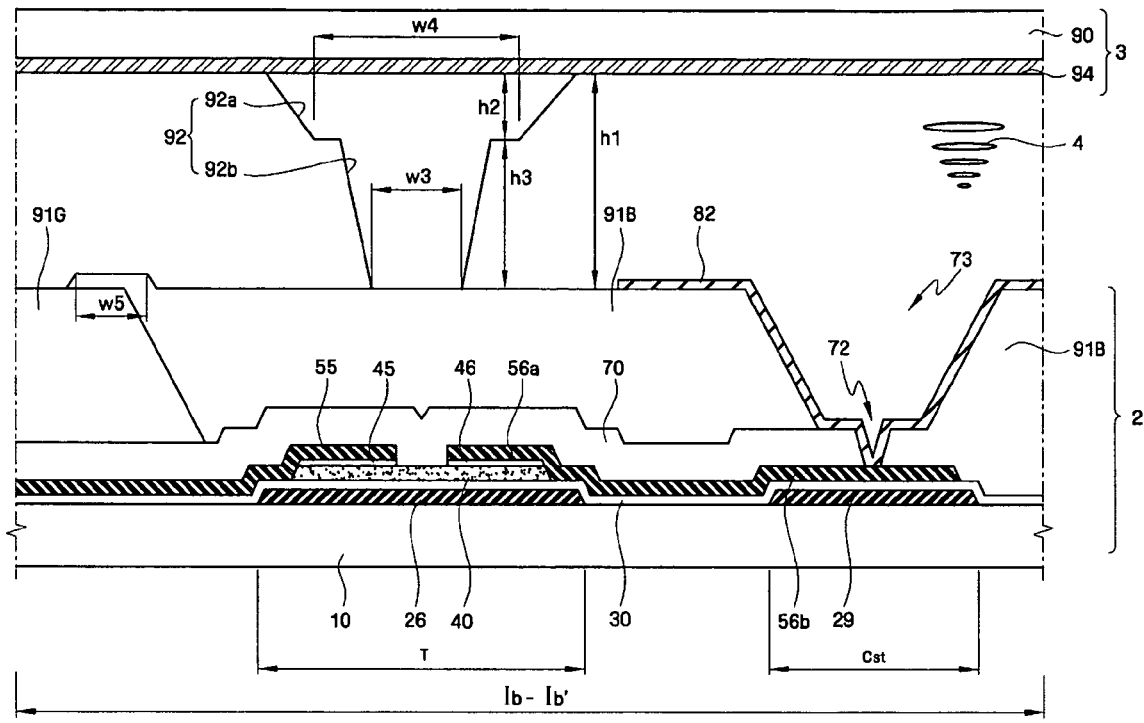
FIG. 1B is a cross-sectional view taken along line Ib-Ib' of FIG. 1A
Figure 1C:
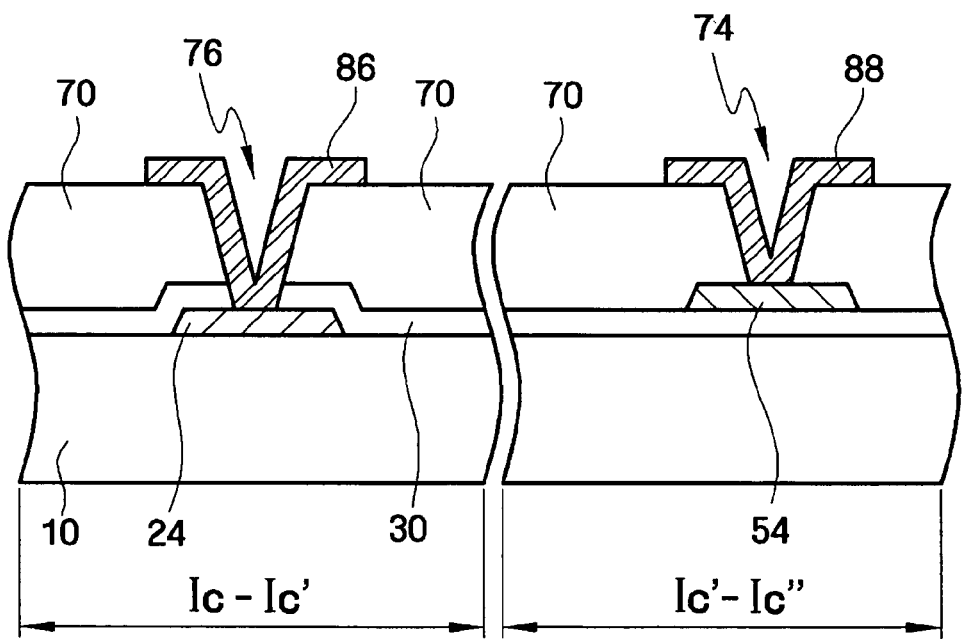
FIG. 1C is a cross-sectional view taken along lines Ic-Ic' and Ic'-Ic" of FIG. 1A.

First, an exemplary embodiment of an LCD 1 according to the present invention will be described with reference to FIGS. 1A to 1C. FIG. 1A is a partial perspective view illustrating an exemplary embodiment of an LCD according to the present invention. FIG. 1B is a cross-sectional view taken along line Ib-Ib' of FIG. 1A. FIG. 1C is a sectional view taken along lines Ic-Ic' and Ic'-Ic" of FIG. 1A.

Referring to FIGS. 1A to 1C, the LCD 1 includes a first plate 2, a second plate 3 facing the first plate 2 and separated by a predetermined distance from the first plate 2, and a liquid crystal layer 4 interposed between the first plate 2 and the second plate 3. The liquid crystal layer has liquid crystal molecules aligned in a predetermined direction.

With respect to the first plate 2, a plurality of gate lines 22 extending in a transverse direction and a plurality of data lines 52 being insulated from the gate lines 22 and extending in a longitudinal direction intersecting the gate lines 22, are disposed on an insulating substrate 10. Thin film transistors T are disposed at areas defined by intersections of the gate lines 22 and the data lines 52. A color filter, including red (not shown), green 91G and blue 91B sub-color filters, is disposed on the gate lines 22 and the data lines 52. Pixel electrodes 82 are disposed on the color filter to correspond to unit pixels.

With respect to the second plate 3, a common electrode 94 and a spacer member 92 are sequentially disposed on an insulating substrate 90. Here, the spacer member 92 is disposed to correspond to each of the thin film transistors T, and prevents light leakage from the thin film transistors T. A fuller description of the second plate 3 will be provided later with reference to FIG. 2A.

A lower polarization plate 11 and an upper polarization plate 12 are disposed on a lower outer surface of the first plate 2 and an upper outer surface of the second plate 3, respectively, to allow only light beams parallel to the polarization axes to pass therethrough. A backlight unit (not shown) used as a light source is disposed below the lower polarization plate 11.

Here, the first plate 2 will be described in more detail with reference to FIGS. 1A to 1C. In the first plate 2, each gate line 22 is formed on the insulating substrate 10 in a transverse direction, and each gate electrode 26 is connected to a respective gate line 22 in the form of a protrusion. A gate line pad 24 receiving a gate signal from the outside and transmitting the received gate signal to the gate line 22 is formed at an end of each gate line 22 The gate line pad 24 is formed to be wider than the gate line 22 in order to effectively connect the gate line 22 to an external circuit.

The gate line 22, the gate line pad 24, and the gate electrode 26 constitute a gate wire (22, 24, 26).

In addition, a plurality of storage electrode lines 28 and a plurality of storage electrodes 29 are formed on the insulating substrate 10. Each storage electrode line 28 extends in a transverse direction across a pixel area p (FIG. 2A) and each storage electrode 29, wider than the storage electrode line 28, is formed at a portion of the storage electrode line 28. The storage electrode line 28 and the storage electrode 29 constitute a storage electrode wire 28, 29 and may vary in shape and arrangement. A voltage, the same level as is applied to the common electrode 94 of the second plate 3, is applied to the storage electrode wire 28, 29.

The gate wire (22, 24, 26) and the storage electrode wire (28, 29) are preferably made of an aluminum (Al) containing metal such as Al or Al alloy, a silver (Ag) containing metal such as Ag or Ag alloy, a copper (Cu) containing metal such as Cu or Cu alloy, a Molybdenum (Mo) containing metal such as Mo or Mo alloy, chromium (Cr), titanium (Ti), or tantalum (Ta).

In addition, the gate wire (22, 24, 26) and the storage electrode wire (28, 29) may have a multi-layered structure including two conductive films (not shown) having different physical characteristics. One of the two films is preferably made of a low resistivity metal such as an Al containing metal, an Ag containing metal, or a Cu containing metal to reduce a signal delay or a voltage drop in the gate wire (22, 24, 26). The other film is preferably made of a material such as a Mo containing metal, Cr, Ta or Ti, which have good physical, chemical, and electrical contact characteristics with respect to other materials such as indium tin oxide (ITO) or indium zinc oxide (IZO). Examples of combinations of the two films are a lower Cr film and an upper Al (Al alloy) film or a lower Al (Al alloy) film and an upper Mo (Mo alloy) film. However, the gate wire (22, 24, 26) and the storage electrode wire 28, 29 may be made of various metals or conductors.

A gate insulating film 30 is formed on the gate wire (22, 24, 26) and the storage electrode wire (28, 29).

The gate insulating film 30 is made of an insulating material such as silicon nitride (SiNx) or silicon oxide (SiOx).

A semiconductor layer 40 made of hydrogenated amorphous silicon or polycrystalline silicon is formed on the gate insulating film 30. The semiconductor layer 40 may be formed in various shapes such as an island shape or a stripe shape, and, for example, may be formed in an island shape over the gate electrode 26. When the semiconductor layer 40 is formed in a stripe shape, it may be disposed under the data line 52 and extend up to the gate electrode 26.

Ohmic contact layers 45 and 46, which are made of silicide or n+amorphous silicon hydride in which an n-type impurity is highly doped, are formed on the semiconductor layer 40. The ohmic contact layers 45 and 46 are interposed between the underlying semiconductor layers 40 and each of the overlying source electrodes 55 and drain electrodes 56a, 56b to reduce the contact resistance between the semiconductor layer 40 and the source electrodes 55 and the drain electrode 56a, 56b. The ohmic contact layers 45 and 46 may be formed in an island shape or a stripe shape. When the ohmic contact layers 45 and 46 are formed in a stripe shape, they may be disposed below the data line 52.

The data line 52 and drain electrodes 56a, 56b are formed on ohmic contact layers 45, 46 and on the gate insulating layer 30. The data line 52 extends longitudinally and intersects the gate line 22 to define a pixel.

A data line pad 54, which receives a data signal from another layer or from an external circuit and transmits the data signal to the data line 52, is formed at one end of each of the data lines 52. The data line pad 54 is formed to be wider than the data line 52 in order to effectively connect the data line 52 to the external circuit.

The source electrode 55 protruding from the data line 52 along the length of a pixel extends over the ohmic contact layer 45. That is, the source electrode 55 is formed to intersect the gate electrode 26 and a portion of the semiconductor layer 40.

The drain electrode 56a, 56b is separated from the source electrode 55 and is formed on the ohmic contact layer 46 opposite to the source electrode 55 at the gate electrode 26. The drain electrode 56a, 56b consists of an electrode portion 56a overlapping with the gate electrode 26 and the semiconductor layer 40 and an extension portion 56b extending from the electrode portion 56a and overlapping the storage electrode 29. The extension portion 56b overlaps the storage electrode 29 with a gate insulating film 30 interposed between the extension portion 56b and the storage electrode 29, forming a storage capacity CSt.

The data line 52, the data line pad 54, the source electrode 55, and the drain electrode 56a, 56b constitute a data wire (52, 54, 55, 56a, 56b). The data line 52 may have various shapes. In one exemplary embodiment, the data line 52 may extend in a longitudinal direction. In an alternative exemplary embodiment, the data line 52 may include bent and longitudinal portions repeated along the length of a pixel.

Thus, a pixel defined when the gate line 22 and the data line 52 intersect may be formed in a square shape or a bent band shape depending on the shape of the data line 52, but the invention is not limited thereto. This exemplary embodiment of the invention will be described as one having a square pixel by way of example.

The data line 52, the source electrode 55 and the drain electrode 56a, 56b are preferably formed of chromium (Cr), a molybdenum (Mo") containing metal, a refractory metal such as tantalum (Ta) or titanium (Ti). The data line 52, the source electrode 55 and the drain electrode 56a, 56b are preferably formed as a single layer or as a multiple layer structure including a lower film (not shown) made of a refractory metal film and a low-resistivity upper film (not shown). Examples of the multiple layer structure include a double-layered structure having a lower Cr film and an upper Al or Al alloy film, a double-layered structure having a lower Mo or Mo alloy film and an upper Al or Al alloy film, and a triple-layered structure (not shown) having a lower Mo film, an intermediate Al film, and an upper Mo film.

The gate electrode 26, the semiconductor layer 40, the source electrode 55 and the drain electrode 56a, 56b constitute a thin film transistor T, which functions as a switching device.

A passivation layer 70 is formed from an organic insulating material on the drain electrode 56a, 55b and the exposed semiconductor layer 40. The passivation layer 70 is preferably made of an inorganic insulation material such as silicon nitride or silicon oxide, a photosensitive organic material having a good flatness characteristic, or a low dielectric insulation material such as a-Si:C:O and a-Si:O:F formed by plasma enhanced chemical vapor deposition ("PECVD").

A contact hole 74 exposing the data line pad 54 is formed on the passivation layer 70, a first contact hole 72 exposing the drain electrode 56a, 56b is formed on the passivation layer 70, and a contact hole 76 exposing the gate line pad 24 is formed on the gate insulating film 30.

In addition, an auxiliary data line pad 88 connected to the data line pad 54 via the contact hole 74 and an auxiliary gate line pad 86 connected to the gate line pad 24 via the contact hole 78 are formed on the passivation layer 70. Here, the pixel electrode 82, the auxiliary gate line pad 86, and the auxiliary data line pad 88 are preferably made of a transparent conductor such as ITO or IZO or reflective conductor such as Al. The auxiliary gate line pad 86 and the auxiliary data line pad 88 complement the adhesion between the gate line pad 24 and data line pad 54, respectively, and external devices.

A color filter (not shown) is disposed on the passivation layer 70 to correspond to a unit pixel area and includes a second contact hole 73 that extends from the first contact hole 72 formed in the passivation layer 70. The color filter (not shown) allows only a light beam having a predetermined wavelength range to pass therethrough. The color filter includes red (not shown), green 91G and blue 91B sub-color filters, and each sub-color filter forms a unit pixel. Red (not shown), green 91G and blue 91B sub-color filters may be arranged in a stripe array, a mosaic array, a delta array, a square array, etc. The color filter (not shown) may be a stripe type where the same sub-color filters (not shown), 91G and 91B are formed in columnar or an island type where the red (not shown), green 91G and blue 91B sub-color filters are separated from one another.

The color filter can be formed using a dyeing method, an electrodepositing method, a pigment dispersing method, a printing method, etc. The pigment dispersing method is generally used. According to a pigment dispersing method, a color filter is formed by repeating the processes of coating an insulating substrate with photoresist resins that have been previously stained with pigments, exposure and development. The formation of a color filter using a pigment dispersing method will now be explained.

First, a red color resin is coated on the entire surface of an insulating substrate 10 having thereon a passivation layer 70, and selectively exposed to light using a patterned mask to form a red sub-color filter on the passivation layer. At this time, the thickness of the red sub-color filter (not shown) may be 3 μm.

Next, a green color resin is coated on the insulating substrate 10 having thereon the red sub-color filter (not shown), and selectively exposed to light using a mask to form a green sub-color filter 91G. At this time, the thickness of the green sub-color filter 91G may be 3 μm.

Next, a blue color resin is coated on the insulating substrate 10 having thereon the red and green sub-color filters (not shown, 91G), and selectively exposed to light using a mask to form a blue sub-color filter. At this time, the thickness of the blue sub-color filter 91B maybe 3 μm.

The red, green and blue sub-color filters (not shown, 91G, 91B) formed according to the above-described method may overlap with the gate lines 22 and the data lines 52. By doing so, light emitted from the backlight unit (not shown) can be blocked by the gate lines 22 and the data lines 52.

Sub-color filters of adjacent two pixels may overlap with each other by a predetermined width w5 above a corresponding data line 52. For example, a blue sub-color filter 91B of a pixel may overlap with a sub-color filter of its adjacent pixel, e.g., a green sub-color filter 91G by the predetermined width w5 above a corresponding data line 52. In more detail, a green sub-color filter 91G and a blue sub-color filter 91B may overlap each other by a width of 3 μm. When sub-color filters (not shown, 91G, 91B) of adjacent two pixels overlap with each other by a predetermined width, the red, green 91G, and blue 91B sub-color filters do not form stepped portions on the gate lines 22 and the data lines 52. Subsequently, liquid crystal molecules of the liquid crystal layer 4 are prevented from being trapped in stepped portions of the red, green 91G, and blue 91B sub-color filters.

Each of the red, green 91G, and blue 91B sub-color filters has the second contact hole 73 extended from the first contact hole 72 in the passivation layer 70.

The pixel electrodes 82 are formed according to pixel shapes on the red, green 91G, and blue 91B sub-color filters. Each of the pixel electrodes 82 is physically electrically connected to a drain electrode extension portion 56b via the first contact hole 72 formed in the passivation layer 70 and the second contact hole 73 formed in each of the red, green 91G, and blue 91B sub-color filters to receive a data voltage from a source electrode 55. When the data voltage is applied to the pixel electrodes 82, the pixel electrodes 82, together with the common electrode 94 of the second plate 3, generate an electrical field. The liquid crystal molecules of the liquid crystal layer 4 between the pixel electrodes 82 and the common electrode 94 are aligned accordingly.

Figure 2A:
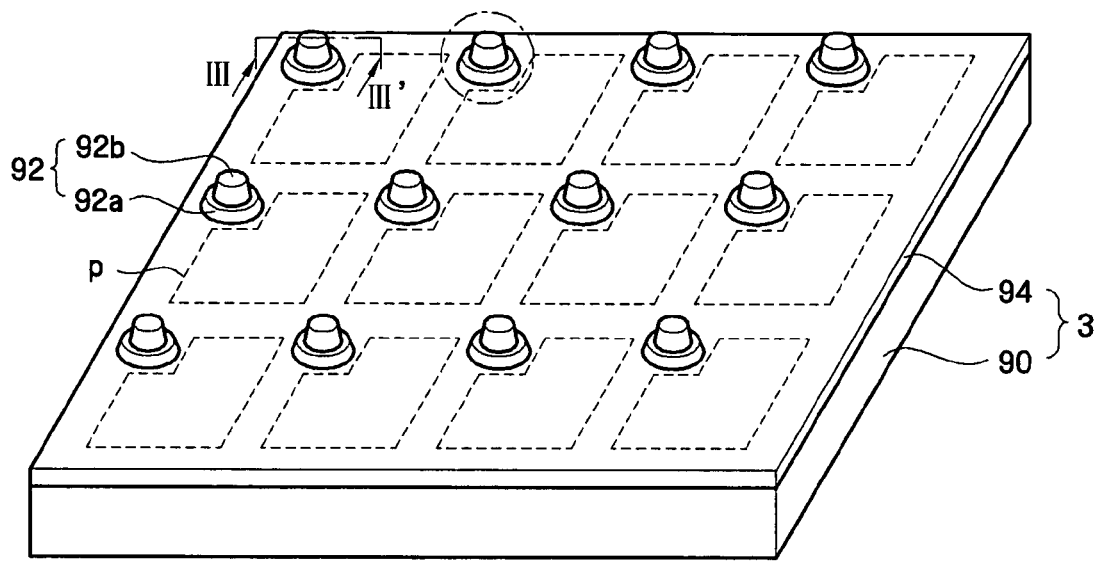
FIG. 2A is a partial perspective view illustrating a second plate of the LCD of FIG. 1A.
Figure 2B:
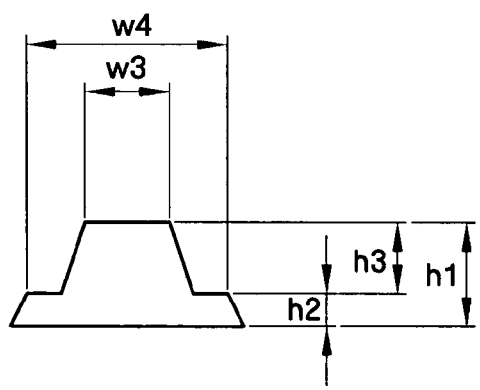
FIG. 2B is an enlarged cross-sectional view of a circled portion of the second plate in FIG. 2A.

The second plate 3 will now be described with reference to FIG. 2A and FIG. 2B. FIG. 2A is a partial perspective view of the second plate 3 of the LCD 1 of FIG. 1A. FIG. 2B is a cross-sectional view of a spacer member 92 of the second plate 3 in FIG. 2A.

Referring to FIGS. 2A and 2B, together with FIGS. 1A and 1B, the second plate 3 has the insulating substrate 90 and the common electrode 94, in which the spacer members 92 are placed on the common electrode 94.

The common electrode 94 is disposed on the insulating substrate 90. The common electrode 94 controls the alignment of liquid crystal molecules of the liquid crystal layer 4 by a potential difference between the common electrode 94 and the pixel electrodes 82 of the first plate 2, thereby displaying color images on a screen. The common electrode 94 may be made of a transparent conductive material, such as indium tin oxide (ITO) or indium zinc oxide (IZO).

Each spacer member 92 is formed in a column shape on the common electrode 94 to so as to correspond to a respective thin film transistor T of the first plate 2. The spacer member 92 prevents light leakage from the thin film transistor T, and maintains a predetermined distance between the first plate 2 and the second plate 3.

The spacer member 92 may be formed in various shapes such as a cylinder or a polygonal column (e.g., square column). The spacer member 92 may have a column shape such that an area of a first surface adjacent to the first plate 2 is the same as or different from the area of a second surface adjacent to the second plate 3. For example, the spacer member 92 may have a truncated-cone or a truncated-pyramid shape such that the area of the second surface is greater than that of the first surface.

At least one of the area of the first surface and the area of the second surface of the spacer member 92 may be greater than the area of each corresponding thin film transistor T. By doing so, light leakage from the thin film transistors T can be prevented, thereby enhancing a smear margin.

As used herein, the term "smear margin" refers to the degree of restoration of a liquid crystal panel when the liquid crystal panel is compressed. Generally, as the cross-sectional area of the spacer member 92, i.e., an area of the section of the spacer member 92 parallel to the face of the insulating substrate 90 increases, the smear margin increases. However, as the cross-sectional area of the spacer member 92 increases, a space for receiving liquid crystal molecules between the first plate 2 and the second plate 3 is reduced. In this regard, when the area of the first surface is different from the area of the second surface, a larger space for receiving liquid crystal molecules can be achieved between the first plate 2 and the second plate 3, compared to when the area of the first surface is the same as the area of the second surface.

As described above, when the area of the first surface of the spacer member 92 is different from the area of the second surface, a stepped surface may be formed between the first surface and the second surface. The stepped surface may be formed by photolithography using a slit mask 60 having a slit pattern in a process of manufacturing the second plate 3, as will be described later (see FIG. 3C). Thus, the spacer member 92 may have a first column 92a adjacent to the insulating substrate 90 with respect to the stepped surface and a second column 92b formed on the first column 92a. Here, the first column 92a and the second column 92b may be formed in various shapes according to the shape and slit pitch of the slit pattern. For example, the first column 92a may have a cylindrical shape, and the second column 92b may have a crucial column shape (e.g., cross-shaped column). An exemplary embodiment of the present invention will be illustrated below in terms of a spacer member 92 having a truncated-cone shape and a stepped surface (e.g., two stacked differently sized frustocones). In other words, the spacer member 92 is defined by a second frustocone on a first frustocone, wherein an area of the first surface corresponding to a base of the first frustocone is greater than the area of the second surface corresponding to a truncated surface of the second frustocone with reference to FIGS. 2A and 2B.

Referring to FIG. 2B, a thickness or height h1 of the spacer member 92 may be substantially the same as a cell gap between the first plate 2 and the second plate 3. For example, the thickness h1 of the spacer member 92 may be about 4.5 μm to about 5.5 μm.

The first column 92a of the spacer member 92 may have a cross-sectional area sufficient to cover the corresponding thin film transistor T to prevent light leakage from the thin film transistor T. For example, a top surface diameter w4 of the first column 92a may be about 30 μm. A thickness or height h2 of the first column 92a may be greater than the thickness of a conventional black matrix. For example, the thickness h2 of the first column 92a may be about 1.5 μM. When the thickness of the first column 92a is increased, the amount of light passing through the spacer member 92 is reduced. That is, the opacity of the spacer member 92 is increased.

In more detail, the optical density ("OD") of the spacer member 92 is defined as the logarithm of the ratio of light incident to the spacer member 92 to light transmitted through the spacer member 92. The OD of the spacer member 92 is proportional to the thickness h1 of the spacer member 92. That is, as the thickness h1 of the spacer member 92 increases, the opacity of the spacer member 92 increases, because the amount of light transmitted through the spacer member 92 decreases as the thickness h1 of the spacer member 92 increases. According to this exemplary embodiment of the present invention, when the thickness h2 of the first column 92a of the spacer member 92 is about two times greater than the thickness of a conventional black matrix, the thickness h1 of the spacer member 92 increases, thereby enhancing the opacity of the spacer member 92.

The cross-sectional area of the second column 92b may be smaller than that of the first column 92a. For example, a top surface diameter w3 of the second column 92b may be about 25 μm.

The spacer member 92 may be made of an organic photosensitive material containing a light-blocking material, such as a photopolymer.

The photopolymer is prepared using a photopolymerizable composition including a photopolymerization initiator, a monomer, a binder and an organic pigment as a light-blocking material, etc.

In the photopolymerizable composition, the photopolymerization initiator may be a highly sensitive and stable triazine (a generic name of three chemical species of six-membered heterocyclic ring compound with three nitrogen atoms, represented by $C_3H_3N_3$)-based compound generating radicals in the presence of light. The monomer is polymerized into its insoluble polymer form in the presence of the radicals generated from the photopolymerizable initiator. The binder allows a liquid monomer to be maintained as a film shape at room temperature so that the monomer is resistant to a developer. In addition, the binder maintains the dispersion stability of the pigment and reliability in the heat resistance, light stability, and drug resistance of a color filter pattern. The pigment may be an organic material with good light stability and heat resistance. Preferably, the pigment may be a black pigment (e.g., carbon black pigment) or a mixture of red, green and blue pigments to prevent light leakage from the thin film transistors T.

Although not shown, an alignment layer for the initial alignment of liquid crystal molecules of the liquid crystal layer 4 is disposed on the spacer member 92 and the common electrode 94. That is, the second column 92b of the spacer member 92 contacts with the first plate 2 via the alignment layer.

As described above, when the spacer member 92 is formed on the common electrode 94, conventional planarization and column spacer formation processes can be omitted, thereby simplifying the manufacturing process of the second plate 3. In addition, since the thickness h2 of the first column 92a is greater than the thickness of a conventional black matrix, the thickness h1 of the spacer member 92 is increased, thereby enhancing the OD of the spacer member 92.

FIGS. 3A to 3D illustrate an exemplary embodiment of a method of manufacturing the second plate 3 of an LCD 1 according to the present invention. The method includes coating an organic photosensitive film (not shown) on the insulating substrate of the second plate, and selectively exposing the organic photosensitive film to light to form a spacer member. The method further includes forming a common electrode before coating the organic photosensitive film.

The method of manufacturing the above-described second plate 3 will now be described in detail with reference to FIGS. 3A to 3D, which are sequential cross-sectional views, taken along line III-III' of FIG. 2A, illustrating a process of manufacturing the second plate 3 of FIG. 2A.

Figure 3A:
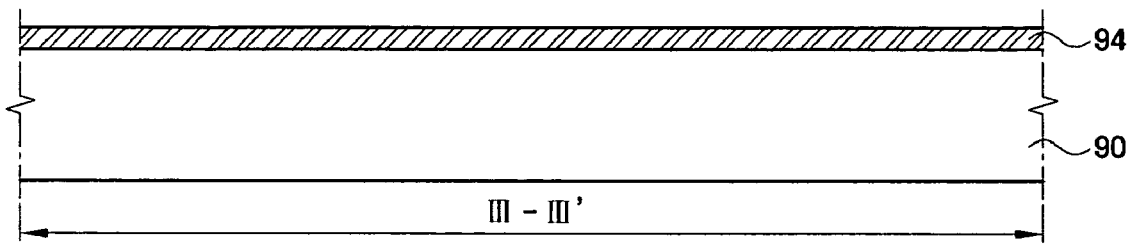
FIGS. 3A to 3D are sequential cross-sectional views, taken along line III-III' of FIG. 2A, to explain an exemplary embodiment of a method of manufacturing the second plate of FIG. 2A.

First, referring to FIG. 3A, a transparent conductive material such as ITO or IZO is coated on an insulating substrate 90 to form a common electrode 94. The common electrode 94 generates an electric field in a liquid crystal layer (see 4 of FIG. 1A) by a potential difference between the common electrode 94 and a pixel electrode (see 82 of FIG. 1A) of a first plate (see 2 of FIG. 1A). After the common electrode 94 is formed on the insulating substrate 90, a spacer member 92 is formed using a photolithography process. Here, the photolithography process is a process of transferring a pattern from a mask onto a thin film deposited on the insulating substrate 90 to form a desired pattern, and includes photoresist coating, exposure, and development to create the desired form.

Photoresist coating is a process of forming a photoresist layer to a uniform thickness on the insulating substrate 90 to obtain a desired pattern. The photoresist coating process includes pre-baking a target surface of the insulating substrate 90 to remove humidity from the target surface of the insulating substrate 90 thereby increasing adhesion between the photoresist and the insulating substrate 90; applying photoresist to the insulating substrate 90 to a predetermined thickness using, for example, spin coating; and soft-baking the resultant insulating substrate 90 and curing the photoresist by evaporating a solvent present in the photoresist coated on the insulating substrate 90.

Figure 3B:
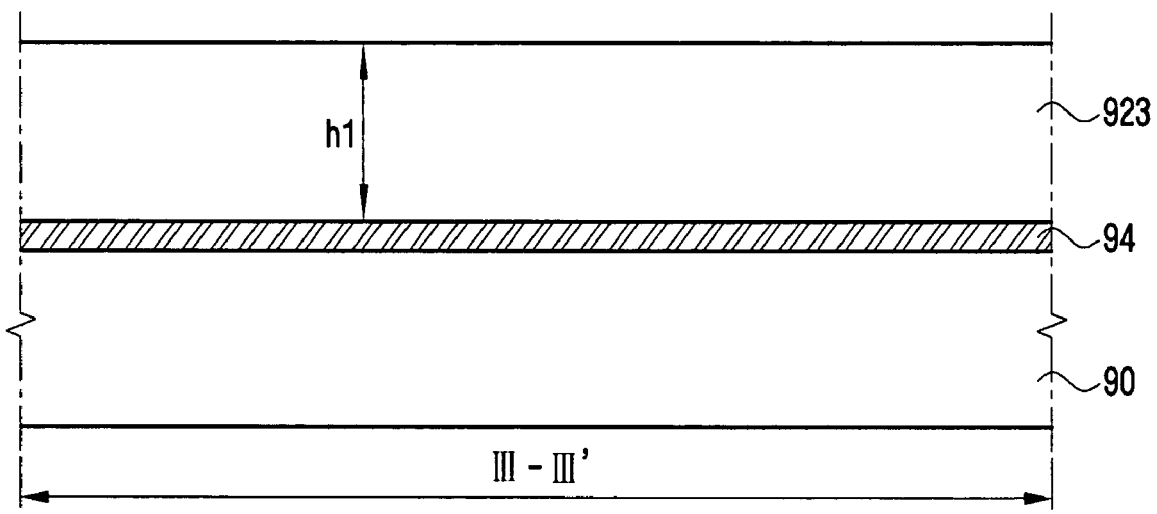

Generally, photoresist includes a solvent used as a viscosity adjustor, a photoactive-based compound, a binder resin used as a chemical binding material, etc. The photoresist is classified as either a positive type photoresist (novolak based resin) whose exposed areas are dissolved in a developer or a negative type photoresist (acryl based monomer) whose unexposed areas are dissolved in a developer. The exemplary embodiment of the present invention will be illustrated below in terms of using a negative type photoresist as an example, even though either may be used When the common electrode 94 is formed on the insulating substrate 90 as shown in FIG. 3A, a photoresist 923, e.g., a photopolymer (an organic material containing a light-blocking material) is formed to a predetermined thickness or height h1 on the common electrode 94, as shown in FIG. 3B. At this time, the thickness h1 of the photoresist 923 may be substantially the same as a thickness of the resultant spacer member 92. For example, the thickness h1 of the photoresist 923 may be about 4.5 μm to about 5.5 μm. The light-blocking material can be carbon black pigment, as described above for an exemplary embodiment of an LCD 1 according to the present invention.

Figure 3C:
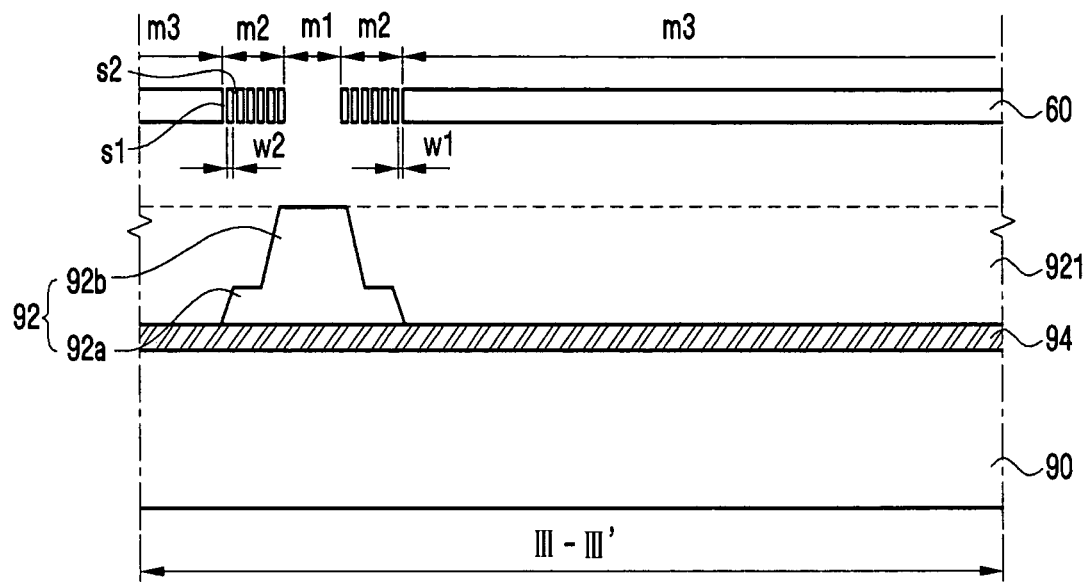

Next, referring to FIG. 3C, a patterned slit mask 60 is appropriately aligned over the resultant structure, and the photoresist 923 is then exposed to light using an exposure machine (not shown) for a predetermined time. At this time, a light source such as g-line (436 nm) or i-line (364 nm) in the ultraviolet ("UV") spectrum may be used.

The slit mask 60 used in the exposure process will now be explained hereinbelow. Generally, the slit mask 60 includes a first region m1 that is a light-transmitting portion, a second region m2 having a slit pattern s1, s2, and a third region m3 that is a light-blocking portion. The photoresist 923 below the first region m1 is unaffected after development since the first region m1 is a light-transmitting portion of the slit mask 60, whereas the photoresist 923 below the third region m3 is completely removed since the third region m3 is a light-blocking portion of the slit mask 60. With respect to the second region m2 of the slit mask, the slit pattern s1, s2 of the second region m2 reduces the intensity of the light incident to the insulating substrate 90 by diffracting the incident light. As a result, the photoresist 923 below the second region m2 of the slit mask 60 is partially removed by development. A slit pitch w2, an interval between two adjacent slits of the second region m2 of the slit mask 60, suitable for diffraction exposure is smaller than the resolution of an exposure light source. For example, a width w1 of each slit may be about 1 μm, and the slit pitch w2 may be about 1 μm.

Alternatively, if the photoresist 923 is a positive type photoresist, the pattern of the slit mask (not shown) is reversed to the above-described slit mask 60 pattern. That is, the first region m1 is a light-blocking portion that permits the photoresist below the first region m1 to be unaffected by development, and the third region m3 is a light-transmitting portion that permits the photoresist below the third region m3 to be completely removed by development.

As described above, in order to partially remove the photoresist below the second region m2, the second region m2 may be a slit mask having slit pattern s1, s2, or may be formed of a translucent film.

When the photoresist 923 is exposed using the slit mask 60, the dimensions of the slit pattern s1, s2 of the slit mask 60 are adjusted so that the resultant spacer member 92 has a desired shape. That is, the dimensions of the slit pattern s1, s2 of the slit mask 60 are adjusted so that the thickness h1 of the photoresist 923 corresponding to the first region m1 and the thickness h2 of the photoresist 923 corresponding to the second region m2 are respectively equal to the thickness of the resultant spacer member 92 and the thickness of a first column 92a of the spacer member 92.

After the exposure using the slit mask 60 is completed, unexposed portions of the photoresist 923 are removed using a developer. If the photoresist 923 is a positive type photoresist, exposed portions of the photoresist 923 are selectively removed.

In a case where the photoresist 923 is a negative type photoresist, when the photoresist 923 is exposed to UV light, molecules of exposed portions of the photoresist 923 are polymerized or cross-linked. For this reason, the exposed portions of the photoresist 923 are left intact during a subsequent development, whereas unexposed portions of the photoresist 923 are removed by reaction with a developer.

In a case where the photoresist 923 is a positive type photoresist inactivated with an inhibitor, when the photoresist 923 is exposed to UV light, exposed portions of the photoresist 923 are activated and become more acidic. During a development using a developer, the acidic exposed portions of the photoresist 923 are removed by neutralization.

A developer used in the development may be a metal ion-free organic alkaline solution. An alkaline component in the organic alkaline solution is completely removed during rinsing. The development may be performed using a spray process of spraying a developer onto the photoresist 923 under a predetermined pressure, a dipping process of dipping the photoresist 923 which has been applied to a substrate 90 in a developer, a puddle process, etc. A combination of spray, dipping, and puddle processes may also be used to achieve a desired development effect.

Figure 3D:
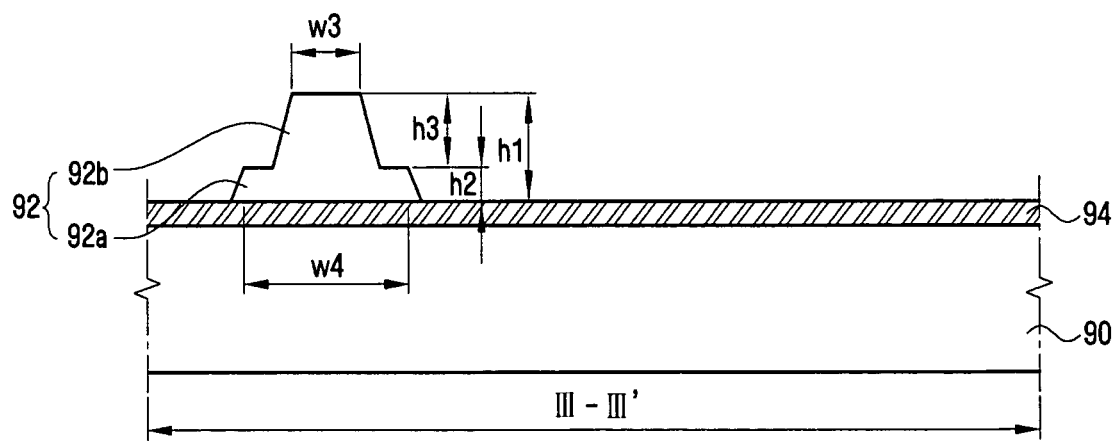

After the development is completed, as shown in FIG. 3D, a spacer member 92 is formed on the common electrode 94. At this time, the shape of the spacer member 92 depends on process parameters such as exposure time and amount, development temperature and time, etc.

The column shape, cross-sectional area of the column and thickness of the spacer member 92 can be formed in the same manner as described above for an exemplary embodiment of an LCD according to the present invention.

The spacer member 92 may correspond to a thin film transistor T (see T of FIG. 1A) to prevent light leakage from the thin film transistor T. In this instance, the thickness or height h1 of the spacer member 92 may be substantially the same as a cell gap (not shown) between a first plate (see 2 of FIG. 1A) and a second plate (see 3 of FIG. 1A). For example, the thickness h1 of the spacer member 92 may be about 4.5 µm to about 5.5 µm.

A first column 92a adjacent to the insulating substrate 90 may have a cross-sectional area sufficient to cover a thin film transistor T. For example, a top surface diameter w4 of the first column 92a may be about 30 µm.

A second column 92b of the spacer member 92 may have a cross-sectional area smaller than the cross-sectional area of the first column 92a to ensure that there is sufficient space to receive the liquid crystal molecules. For example, a top surface diameter w3 of the second column 92b may be about 25 µM.

After the spacer members 92 are formed according to the above-described process, an alignment layer (not shown) for an initial alignment of liquid crystal molecules is formed. The alignment layer may be made of a polyimide resin.

Figure 4A:
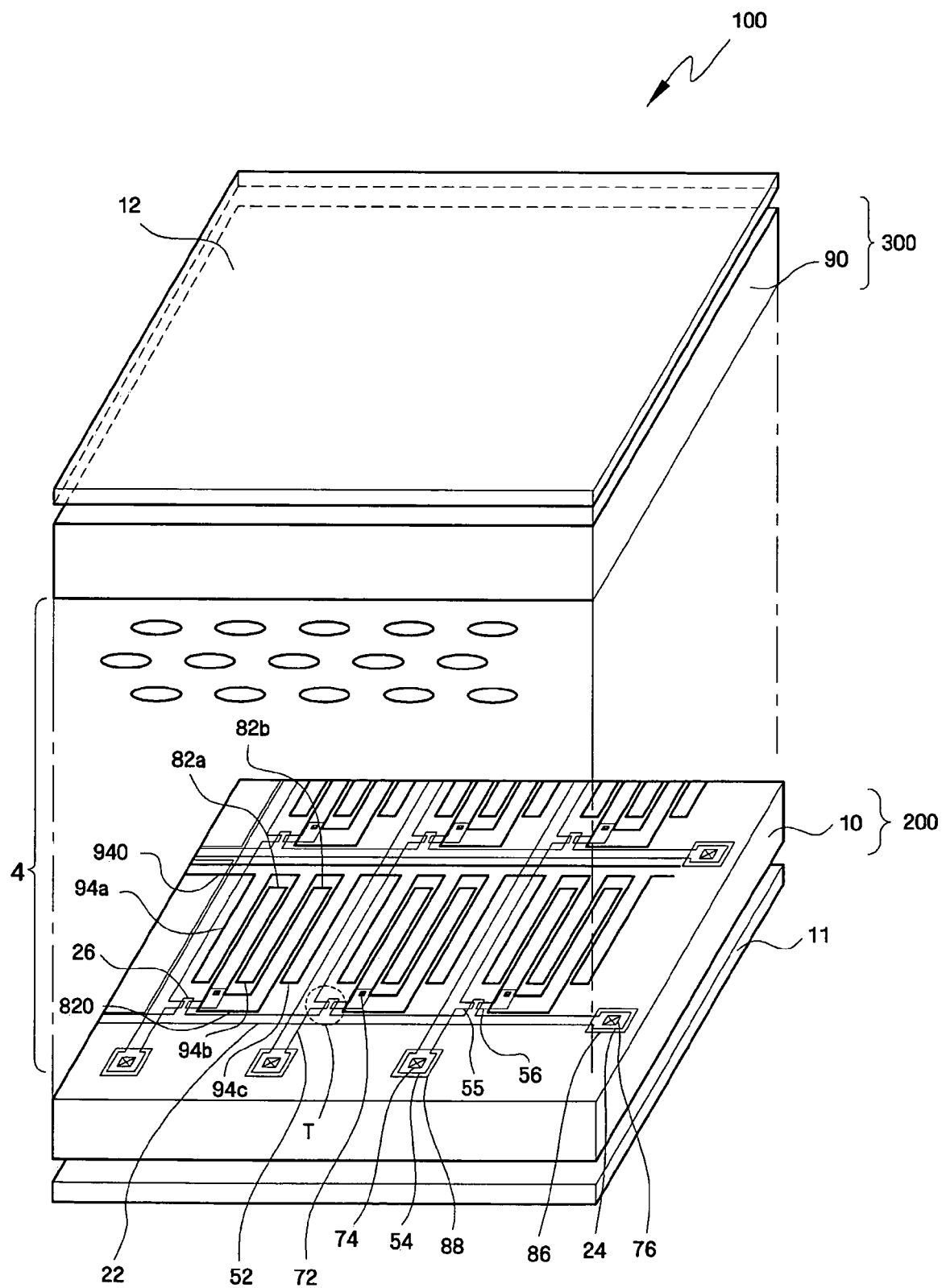
FIG. 4A is a partial perspective view illustrating another exemplary embodiment of an LCD according to the present invention.
Figure 4B:
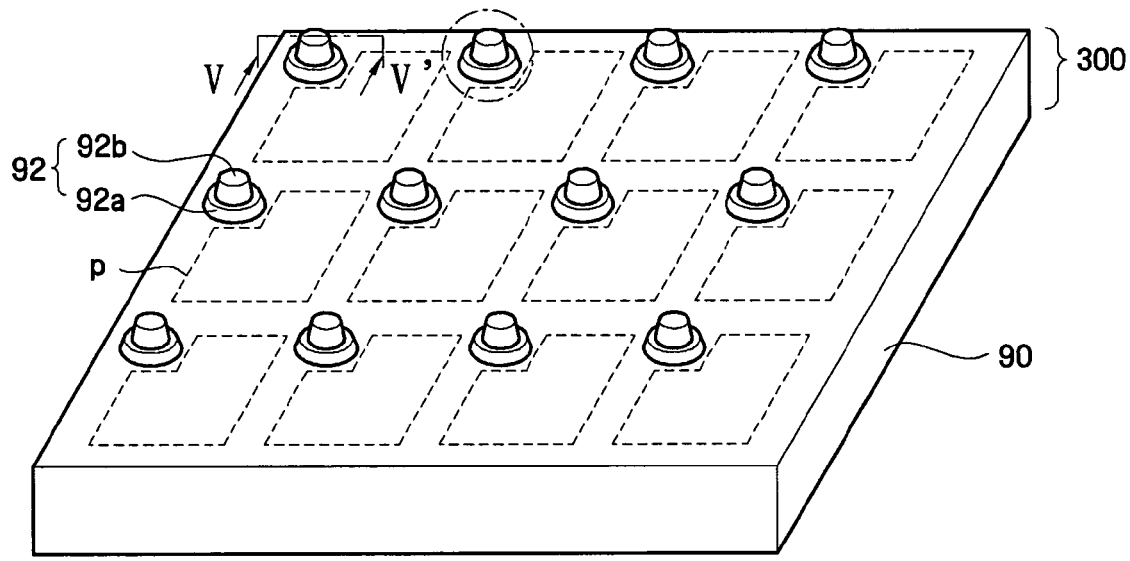
FIG. 4B is a partial perspective view illustrating a second plate of the LCD of FIG. 4A.
Figure 4C:
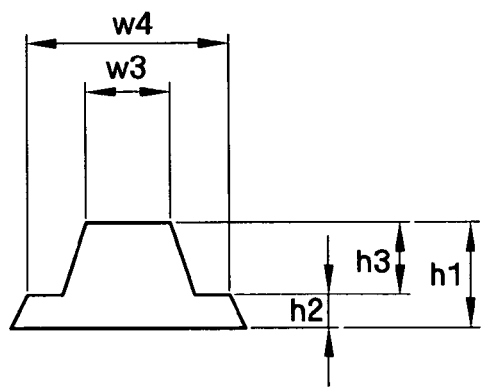
FIG. 4C is an enlarged cross-sectional view of a circled portion of the second plate in FIG. 4B.

Hereinafter, another exemplary embodiment of an LCD according to the present invention will be described with reference to FIGS. 4A, 4B and 4C. FIG. 4A is a partial perspective view illustrating another exemplary embodiment of an LCD 100 according to the present invention, and FIG. 4B is a partial perspective view of a second plate 300 of the LCD 100 of FIG. 4A. FIG. 4C is a cross-sectional view of a spacer member 92 in FIG. 4B.

For convenience of illustration, common elements having the same functions as those in the previously discussed exemplary embodiment of the present invention are represented by the same reference numerals, and thus, a detailed description thereof will be omitted.

The LCD 100 of the current exemplary embodiment of the present invention has substantially the same structure as the LCD 1 of the previously discussed exemplary embodiment shown in FIGS. 1A to 2 except as explained below. Referring to FIG. 4A, a first plate 200 includes thin film transistors T, a color filter (not shown), pixel electrodes (not shown) having pixel electrode patterns 82a and 82b, and common electrodes (not shown) having common electrode patterns 94a, 94b and 94c.

In more detail with respect to the first plate 200, gate lines 22 and data lines 52 intersect each other, and the thin film transistors T are disposed at intersections of the gate lines 22 and the data lines 52. The intersections of the gate lines 22 and the data lines 52 are defined as pixel areas. Each pixel area has the common electrode patterns 94a, 94b and 94c and the pixel electrode patterns 82a and 82b disposed therein.

The thin film transistors T are connected to the draw line 820. The pixel electrode patterns 82a and 82b diverge from the draw lines 820 and extend in the same direction as the data lines 52. Common lines 940 extend in the same direction as the gate lines 22 and are separated from the gate lines 22 by a predetermined distance. The common electrode patterns 94a, 94b and 94c diverge from the common lines 940 and alternate with the pixel electrode patterns 82a and 82b.

The pixel electrode patterns 82a and 82b and the common electrode patterns 94a, 94b and 94c may be formed in various shapes. For example, the pixel electrode patterns 82a and 82b and the common electrode patterns 94a, 94b and 94c may be bent several times to form zigzag lines. In this case, liquid crystal molecules between the pixel electrode patterns 82a and 82b and the common electrode patterns 94a, 94b and 94c are aligned in different manners with respect to the bends of the pixel electrode patterns 82a and 82b and the common electrode patterns 94a, 94b and 94c to form a multi-domain structure, thereby ensuring a wider viewing angle than a conventional straight electrode structure.

In the LCD 100 having the above-described structure, the horizontal alignment of liquid crystal molecules is adjusted by a horizontal electric field formed between the pixel electrode patterns 82a and 82b and the common electrode patterns 94a, 94b, and 94c. An area where the horizontal alignment of liquid crystal molecules is adjusted is substantially defined as an "opening area". The LCD 100 of FIG. 4A has four opening areas.

As shown in FIG. 4B, a second plate 300 is structured such that a plurality of spacer members 92 is disposed on an insulating substrate 90.

Each spacer member 92 in the present exemplary embodiment has substantially the same structure as the spacer member of the exemplary embodiment shown in FIG. 3. Thus, a detailed description thereof will be omitted.

Figure 5A:
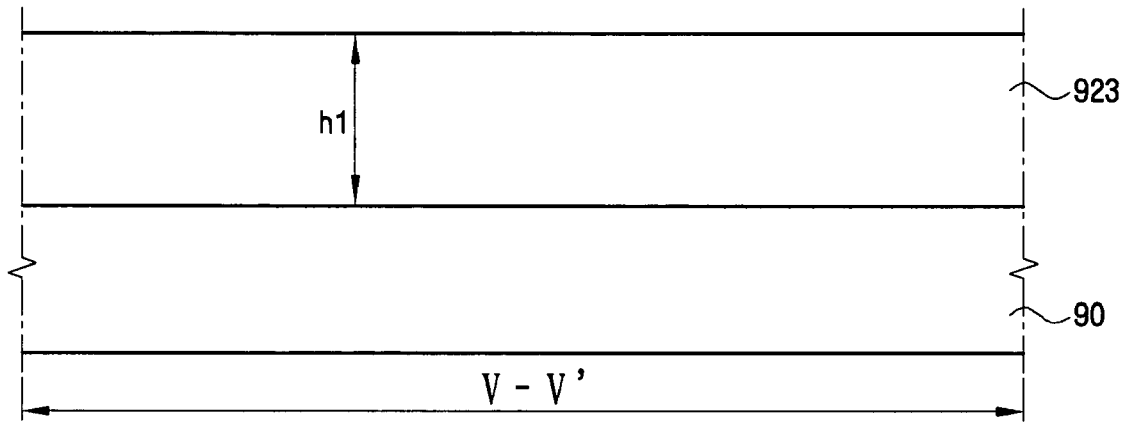
FIGS. 5A to 5C are sequential cross-sectional views, taken along line V-V' of FIG. 4B, to explain an exemplary embodiment of a method of manufacturing the second plate of FIG. 4B.
Figure 5B:
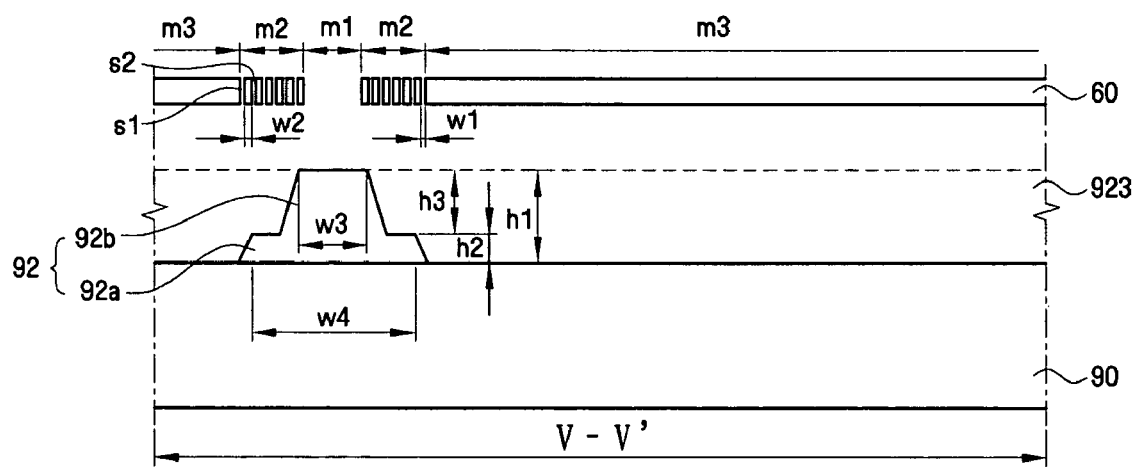
Figure 5C:
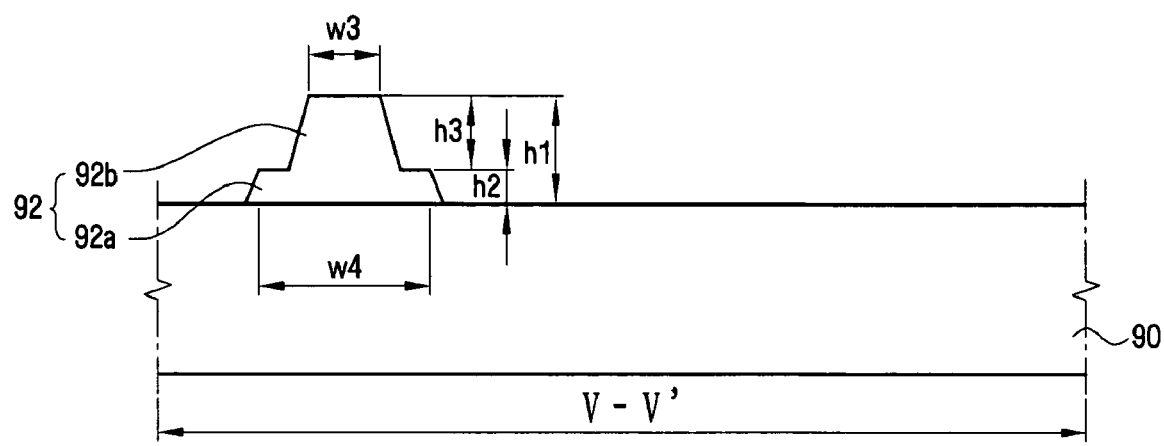

Hereinafter, a method of manufacturing the second plate 300 will be described with reference to FIGS. 5A to 5C. FIGS. 5A to 5C are sequential cross-sectional views, taken along line V-V' of FIG. 4B, illustrating a process of manufacturing the second plate 300 of FIG. 4B.

First, referring to FIG. 5A, a photoresist 923, e.g., a photopolymer, is formed to a predetermined thickness or height h1 on an insulating substrate 90. At this time, the thickness h1 of the photoresist 923 may be substantially the same as the thickness of the resultant spacer member 92. For example, the thickness h1 of the photoresist 923 may be about 4.5 µm to about 5.5 µm.

Next, referring to FIG. 5B, a patterned slit mask 60 is appropriately aligned over the resultant structure, and the photoresist 923 is then exposed to light using an exposure machine (not shown) for a predetermined time. A light source such as g-line (436 nm) or i-line (364 nm) in the UV spectrum may be used.

Next, referring to FIG. 5C, unexposed portions of the photoresist 923 are selectively removed using a developer, to form a spacer member 92 composed of a first column 92a and a second column 92b on the insulating substrate 90. According to the above-described method, conventional planarization and column spacer formation processes can be omitted, thereby simplifying the manufacturing process of the second plate 300.

An LCD and a method of manufacturing the same according to the present invention provide the following advantages.

First, a spacer member formation process is substituted for conventional planarization and column spacer formation processes, thereby simplifying the manufacturing process of a second plate.

Second, since the thickness of a spacer member is thicker than that of a conventional black matrix, the optical density of the spacer member can be enhanced.

Third, since the cross-sectional area of the spacer member is greater than that of a conventional column spacer, a smear margin can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the present invention.

What is claimed is:

1. A liquid crystal display comprising:
a first plate having a thin film transistor;
a second plate having an insulating substrate;
a spacer member being disposed on the insulating substrate preventing light leakage from the first plate and maintaining a predetermined distance between the first plate and the second plate; and
a liquid crystal layer interposed between the first plate and the second plate and having liquid crystal molecules aligned in a predetermined direction,
wherein the spacer member comprises a first column adjacent to the insulating substrate a second column disposed on the first column, and
a stepped surface disposed between the first column and the second column, and wherein the spacer member comprises an organic photosensitive material containing a light-blocking material.

2. The liquid crystal display of claim 1, wherein an area of a first surface of the spacer member adjacent to the first plate is different from an area of a second surface of the spacer member adjacent to the second plate.

3. The liquid crystal display of claim 2, wherein at least one of the area of the first surface and the area of the second surface is greater than an area of the thin film transistor.

4. The liquid crystal display of claim 3, wherein the spacer member is defined by a second frustocone on a first frustocone, and wherein the area of the first surface corresponding to a base of the first frustocone is greater than the area of the second surface corresponding to a truncated surface of the second frustocone.

5. The liquid crystal display of claim 1, wherein the thickness of the spacer member is substantially the same as a cell gap between the first plate and the second plate.

6. The liquid crystal display of claim 1, wherein the light-blocking material is carbon black pigment.

7. The liquid crystal display of claim 1, wherein the second plate further comprises a common electrode between the insulating substrate and the spacer member.

8. A method of manufacturing a liquid crystal display, comprising:
coating an organic photosensitive film containing a light-blocking material on an insulating substrate of a second plate; and
selectively exposing the organic photosensitive film to light using a slit mask to form a spacer member, the spacer member preventing light leakage from a thin film transistor of a first plate and maintaining a predetermined distance between the first plate and the second plate, wherein the spacer member comprises a first column adjacent to the insulating substrate, a second column disposed on the first column, and a stepped surface disposed between the first column and the second column.

9. The method of claim 8, wherein the method further comprises forming a common electrode between the insulating substrate and the spacer member before the coating the organic photosensitive film on the insulating substrate.

10. The method of claim 8, wherein the light-blocking material is a carbon black pigment.

11. The method of claim 8, wherein an area of a first surface of the spacer member adjacent to the first plate different from that of a second surface of the spacer member adjacent to the second plate.

12. The method of claim 11, wherein at least one of the area of the first surface and the area of the second surface is greater than an area of the thin film transistor.

13. The method of claim 11, wherein the spacer member is defined by a second frustocone on a first frustocone, and wherein the area of the first surface corresponding to a base of the first frustocone is greater than the area of the second surface corresponding to a truncated surface of the second frustocone.

14. The method of claim 8, wherein the thickness of the spacer member is substantially the same as a cell gap between the first plate and the second plate.

* * * * *